(12) United States Patent
Hur et al.

(10) Patent No.: US 11,782,151 B2
(45) Date of Patent: Oct. 10, 2023

(54) ELECTRONIC DEVICES WITH NON-STATIC OBJECT DETECTION

(71) Applicant: Apple Inc., Cupertino, CA (US)

(72) Inventors: Joonhoi Hur, Sunnyvale, CA (US);
Andreas Menkhoff, Oberhaching (DE);
Bernhard Sogl, Unterhaching (DE);
Jochen Schrattenecker, Alberndorf in der Riedmark (AT); Rastislav Vazny, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 17/332,221

(22) Filed: May 27, 2021

(65) Prior Publication Data

US 2022/0381900 A1 Dec. 1, 2022

(51) Int. Cl.
*G01S 13/88* (2006.01)
*G01S 13/08* (2006.01)

(52) U.S. Cl.
CPC .............. *G01S 13/88* (2013.01); *G01S 13/08* (2013.01)

(58) Field of Classification Search
CPC .......... G01S 13/88; G01S 13/08; G01S 7/539; G01S 7/48
See application file for complete search history.

(56) References Cited

U.S. PATENT DOCUMENTS

| | | | |
|---|---|---|---|
| 8,417,296 B2 | 4/2013 | Caballero et al. | |
| 8,781,420 B2 | 7/2014 | Schlub et al. | |
| 11,013,075 B2* | 5/2021 | Lester | H05B 6/50 |
| 2010/0093293 A1* | 4/2010 | Grebennikov | G01S 13/87 |
| | | | 455/150.1 |
| 2010/0219840 A1* | 9/2010 | Motojima | H03K 17/955 |
| | | | 324/633 |
| 2015/0162944 A1* | 6/2015 | Peter | H04B 17/103 |
| | | | 455/73 |
| 2020/0044612 A1* | 2/2020 | Bologna | H04B 1/3838 |
| 2020/0106306 A1* | 4/2020 | Logan | B60L 1/00 |
| 2021/0133399 A1* | 5/2021 | Coelho De Souza | |
| | | | G06F 3/04883 |
| 2021/0318423 A1* | 10/2021 | Wang | G01S 11/02 |
| 2022/0301705 A1* | 9/2022 | Oh | G16H 30/20 |

OTHER PUBLICATIONS

U.S. Appl. No. 17/200,311, filed Mar. 12, 2021.

* cited by examiner

*Primary Examiner* — Timothy A Brainard
*Assistant Examiner* — Kenneth W Good
(74) *Attorney, Agent, or Firm* — Treyz Law Group, P.C.; Michael H. Lyons

(57) ABSTRACT

An electronic device may include a voltage standing wave ratio (VSWR) sensor disposed along a radio-frequency transmission line between a signal generator and an antenna. The VSWR sensor may gather VSWR measurements from radio-frequency signals transmitted by the signal generator over the transmission line. Control circuitry may identify a variation in the VSWR measurements over time and may compare the variation to a threshold value to determine whether an external object in the vicinity of the antenna is animate or inanimate. The control circuitry may reduce the maximum transmit power level of the antenna when the external object is animate and may maintain or increase the maximum transmit power level when the external object is inanimate. This may serve to maximize the wireless performance of the electronic device while also ensuring that the device complies with regulatory limits on radio-frequency energy exposure.

14 Claims, 10 Drawing Sheets

ELECTRONIC DEVICES WITH NON-STATIC OBJECT DETECTION

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is sometimes used to perform spatial ranging operations in which radio-frequency signals are used to estimate a distance between the electronic device and external objects.

It can be challenging to provide wireless circuitry that accurately estimates this distance. For example, the wireless circuitry will often exhibit a blind spot near the device within which the wireless circuitry is unable to accurately detect the presence of external objects. In addition, it can be difficult for the wireless circuitry to distinguish between animate and inanimate external objects.

SUMMARY

An electronic device may include wireless circuitry controlled by one or more processors. The wireless circuitry may include an antenna coupled to a signal generator over a radio-frequency transmission line. A voltage standing wave ratio (VSWR) sensor may be disposed along the radio-frequency transmission line. The signal generator may transmit radio-frequency signals over the radio-frequency transmission line. The radio-frequency signals may be communications signals, radar signals, or dedicated test signals. The VSWR sensor may gather VSWR measurements from the transmitted radio-frequency signals during a sampling period.

The one or more processors may identify a variation in the VSWR measurements gathered over the sampling period as a function of time. The one or more processors may compare the variation to a threshold value to determine whether an external object in the vicinity of the antenna is animate or inanimate. The one or more processors may identify that the external object is animate when the variation exceeds the threshold value. The one or more processors may identify that the external object is inanimate when the variation is less than the threshold value. The one or more processors may reduce a maximum transmit power level of the antenna and may optionally identify a range to the external object in response to identifying that the external object is animate. The one or more processors may maintain or increase the maximum transmit power level and may optionally perform removable case detection in response to identifying that the external object is inanimate. This may serve to maximize the wireless performance of the electronic device while also ensuring that the device complies with regulatory limits on radio-frequency energy exposure.

An aspect of the disclosure provides an electronic device operable in an environment that includes an external object. The electronic device can include an antenna. The electronic device can include a voltage standing wave ratio (VSWR) sensor communicably coupled to the antenna. The VSWR sensor can be configured to perform VSWR measurements from radio-frequency signals transmitted by the antenna. The electronic device can include one or more processors. The one or more processors can be configured to identify a variation in the VSWR measurements over time. The one or more processors can be configured to determine whether the external object is animate or inanimate based on the identified variation in the VSWR measurements.

An aspect of the disclosure provides a method of operating an electronic device to perform animate object detection on an object external to the electronic device. The method can include with a signal generator, transmitting radio-frequency signals during a sampling period over a radio-frequency transmission line communicably coupled to an antenna. The method can include with a voltage standing wave ratio (VSWR) sensor disposed along the radio-frequency transmission line, performing VSWR measurements from the radio-frequency signals transmitted over the radio-frequency transmission line during the sampling period. The method can include with one or more processors, identifying a variation in the VSWR measurements as a function of time within the sampling period. The method can include with the one or more processors, identifying that the object is animate when the identified variation exceeds a threshold value. The method can include with the one or more processors, identifying that the object is inanimate when the identified variation is less than the threshold value.

An aspect of the disclosure provides an electronic device. The electronic device can include an antenna. The electronic device can include a voltage standing wave ratio (VSWR) sensor communicably coupled to the antenna. The VSWR sensor can be configured to measure VSWR values from radio-frequency signals transmitted by the antenna. The electronic device can include one or more processors. The one or more processors can be configured to identify a variation in the VSWR values over time. The one or more processors can be configured to decrease a maximum transmit power level of the antenna when the identified variation exceeds a threshold value. The one or more processors can be configured to maintain or increase the maximum transmit power level of the antenna when the identified variation is less than the threshold value.

DETAILED DESCRIPTION

Figure 1:
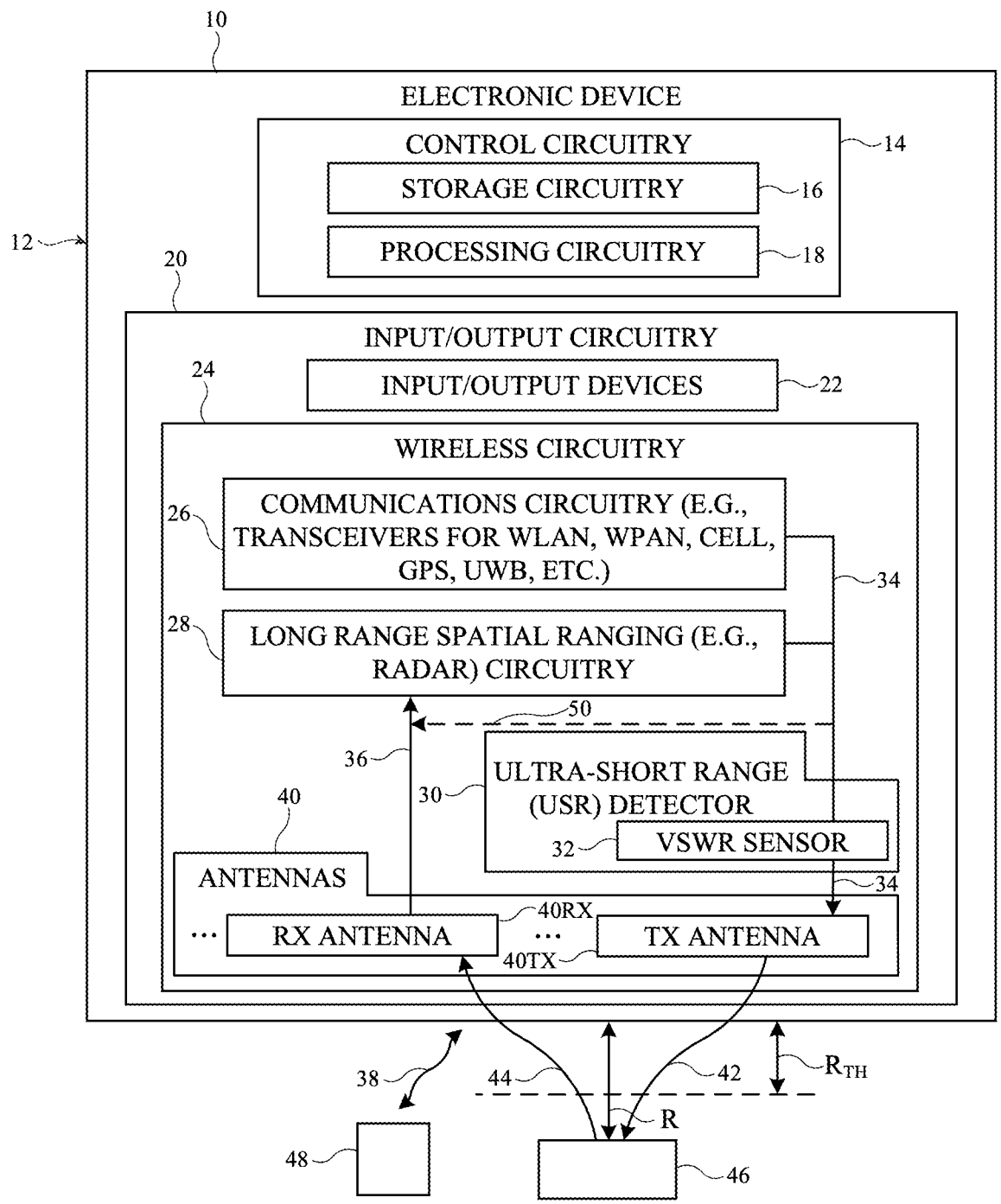
FIG. 1 is a functional block diagram of an illustrative electronic device having a transmit antenna that is used to perform animate external object detection in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, temperature sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and/or radio-based spatial ranging operations. Wireless circuitry 24 may include two or more antennas 40. Wireless circuitry 24 may also include baseband processor circuitry, transceiver circuitry, amplifier circuitry, filter circuitry, switching circuitry, analog-to-digital converter (ADC) circuitry, digital-to-analog converter (DAC) circuitry, radio-frequency transmission lines, and/or any other circuitry for transmitting and/or receiving radio-frequency signals using antennas 40.

Antennas 40 may be formed using any desired antenna structures. For example, antennas 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antennas 40 over time.

Antennas 40 may include one or more transmit (TX) antennas such as transmit antenna 40TX and one or more receive (RX) antennas such as receive antenna 40RX. Antennas 40 may include zero, one, or more than one additional antenna used in the transmission and/or reception of radio-frequency signals. Transmit antenna 40TX may transmit radio-frequency signals such as radio-frequency signals 42 and/or radio-frequency signals 38. Receive antenna 40RX may receive radio-frequency signals such as radio-frequency signals 44 and/or radio-frequency signals 38. Wireless circuitry 24 may use antennas 40 to transmit and/or receive radio-frequency signals 38 to convey wireless communications data between device 10 and external wireless communications equipment 48 (e.g., one or more other devices such as device 10, a wireless access point or base station, etc.). Wireless communications data may be conveyed by wireless circuitry 24 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Wireless circuitry 24 may include communications circuitry 26 (sometimes referred to herein as wireless communications circuitry 26) for transmitting and/or receiving wireless communications data using antennas 40. Communications circuitry 26 may include baseband circuitry (e.g., one or more baseband processors) and one or more radios (e.g., radio-frequency transceivers, modems, etc.) for conveying radio-frequency signals 38 using one or more antennas 40 (e.g., transmit antenna 40TX, receive antenna 40RX, and/or other antennas 40).

Communications circuitry 26 may transmit and/or receive radio-frequency signals 38 within a corresponding frequency band at radio frequencies (sometimes referred to herein as a communications band or simply as a "band"). The frequency bands handled by communications circuitry 26 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Communications circuitry 26 may be coupled to antennas 40 using one or more transmit paths and/or one or more receive paths. Communications circuitry 26 uses the transmit paths to transmit radio-frequency signals 38 and uses the receive paths to receive radio-frequency signals 38. If desired, communications circuitry 26 may be coupled to transmit antenna 40TX over a transmit path such as transmit path 34. Communications circuitry 26 may use transmit path 34 to transmit radio-frequency signals 38 using transmit antenna 40TX. Transmit path 34 (sometimes referred to herein as transmit chain 34) may include one or more signal paths (e.g., radio-frequency transmission lines), amplifier circuitry, filter circuitry, switching circuitry, radio-frequency front end circuitry (e.g., components on a radio-frequency front end module), and/or any other desired paths or circuitry for transmitting radio-frequency signals from communications circuitry 26 to transmit antenna 40TX.

In addition to conveying wireless communications data, wireless circuitry 24 may also use antennas 40 to perform spatial ranging operations. Wireless circuitry 24 may include long range spatial ranging circuitry 28 for performing spatial ranging operations. Long range spatial ranging circuitry 28 may include mixer circuitry, amplifier circuitry, transmitter circuitry (e.g., signal generators, synthesizers, etc.), receiver circuitry, filter circuitry, baseband circuitry, ADC circuitry, DAC circuitry, and/or any other desired components used in performing spatial ranging operations using antennas 40. Long range spatial ranging circuitry 28 may include, for example, radar circuitry (e.g., frequency modulated continuous wave (FMCW) radar circuitry, OFDM radar circuitry, FSCW radar circuitry, a phase coded radar circuitry, other types of radar circuitry). Antennas 40 may include separate antennas for conveying wireless communications data and radio-frequency signals for spatial ranging or may include one or more antennas 40 that are used to both convey wireless communications data and to perform spatial ranging. Using a single antenna 40 to both convey wireless communications data and perform spatial ranging may, for example, serve to minimize the amount of space occupied in device 10 by antennas 40.

In one embodiment that is described herein as an example, wireless circuitry 24 may use transmit antenna 40TX to both convey wireless communications data for communications circuitry 26 and perform spatial ranging operations for long ranging spatial ranging circuitry 28. Long range spatial ranging circuitry 28 may therefore be coupled to transmit antenna 40TX over transmit path 34. When performing spatial ranging operations, long range spatial ranging circuitry 28 may use transmit antenna 40TX to transmit radio-frequency signals 42. Radio-frequency signals 42 may include one or more signal tones, continuous waves of radio-frequency energy, wideband signals, chirp signals, or any other desired transmit signals (e.g., radar signals) for use in spatial ranging operations. Unlike radio-frequency signals 38, radio-frequency signals 42 may be free from wireless communications data (e.g., cellular communications data packets, WLAN communications data packets, etc.). Radio-frequency signals 42 may sometimes also be referred to herein as spatial ranging signals 42, long range spatial ranging signals 42, or radar signals 42. Long range spatial ranging circuitry 28 may transmit radio-frequency signals 42 at one or more carrier frequencies in a corresponding radio frequency band such (e.g., a frequency band that includes frequencies greater than around 10 GHz, greater than around 20 GHz, less than 10 GHz, 20-30 GHz, greater than 40 GHz, etc.).

Radio-frequency signals 42 may reflect off of objects external to device 10 such as external object 46. External object 46 may be, for example, the ground, a building, part of a building, a wall, furniture, a ceiling, a person, a body part, an animal, a vehicle, a landscape or geographic feature, an obstacle, external communications equipment such as external wireless communications equipment 48, another device of the same type as device 10 or a peripheral device such as a gaming controller or remote control, or any other physical object or entity that is external to device 10. Receive antenna 40RX may receive reflected radio-frequency signals 44. Reflected signals 44 may be a reflected version of the transmitted radio-frequency signals 42 that have reflected off of external object 46 and back towards device 10.

Receive antenna 40RX may be coupled to long range spatial ranging circuitry 28 over receive path 36 (sometimes referred to herein as receive chain 36). Long range spatial ranging circuitry 28 may receive reflected signals 44 from receive antenna 40RX via receive path 36. Receive path 36 may include one or more signal paths (e.g., radio-frequency transmission lines), amplifier circuitry (e.g., low noise amplifier (LNA) circuitry), filter circuitry, switching circuitry, radio-frequency front end circuitry (e.g., components on a radio-frequency front end module), and/or any other desired paths or circuitry for conveying radio-frequency signals from receive antenna 40RX to long range spatial ranging circuitry 28.

Control circuitry 14 may process the transmitted radio-frequency signals 42 and the received reflected signals 44 to detect or estimate the range R between device 10 and external object 46. If desired, control circuitry 14 may also process the transmitted and received signals to identify a two or three-dimensional spatial location (position) of external object 46, a velocity of external object 46, and/or an angle of arrival of reflected signals 44. If desired, a loopback path such as loopback path 50 may be coupled between transmit path 34 and receive path 36. Loopback path 50 may be used to convey transmit signals on transmit path 34 to receiver circuitry in long range spatial ranging circuitry 28. As an example, in embodiments where long range spatial ranging circuitry 28 performs spatial ranging using an FMCW scheme, loopback path 50 may be a de-chirp path that conveys chirp signals on transmit path 34 to a de-chirp mixer in long range spatial ranging circuitry 28. In these embodiments, doppler shifts in continuous wave transmit signals may be detected and processed to identify the velocity of external object 46, and the time dependent frequency difference between radio-frequency signals 42 and reflected signals 44 may be detected and processed to identify range R and/or the position of external object 46. Use of continuous wave signals for estimating range R may allow control circuitry 14 to reliably distinguish between external object 46 and other background or slower-moving objects, for example. This example is merely illustrative and, in general, long range spatial ranging circuitry 28 may implement any desired radar or long range spatial ranging scheme.

The radio-frequency transmission lines in transmit path 34 and receive path 36 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device may be integrated into rigid and/or flexible printed circuit boards if desired. One or more radio-frequency lines may be shared between transmit path 34 and receive path 36 if desired. The components of wireless circuitry 24 may be formed on one or more common substrates or modules (e.g., rigid printed circuit boards, flexible printed circuit boards, integrated circuits, chips, packages, systems-on-chip, etc.).

The example of FIG. 1 is merely illustrative. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, some or all of the baseband circuitry in wireless circuitry 24 may form a part of control circuitry 14. In addition, wireless circuitry 24 may include any desired number of antennas 40. Antennas 40 may include more than one transmit antenna 40TX, more than one receive antenna 40RX, and zero, one, or more than one other antenna 40. Each antenna 40 may be coupled to communications circuitry 26 and/or long range spatial ranging circuitry 28 over dedicated transmit and/or receive paths or over one or more transmit and/or receive paths that are shared between antennas.

Long range spatial ranging circuitry 28 need not be coupled to all of the antennas 40 in wireless circuitry 24. Similarly, communications circuitry 26 need not be coupled to all of the antennas 40 in wireless circuitry 24 (e.g., some antennas 40 may be used to only perform spatial ranging operations without conveying wireless communications data or to only convey wireless communications data without performing spatial ranging). Antennas 40 that are only used to receive signals may be coupled to communications circuitry 26 and/or long range spatial ranging circuitry 28 using one or more receive paths (e.g., receive path 36). Antennas 40 that are only used to transmit signals may be coupled to communications circuitry 26 and/or long range spatial ranging circuitry 28 using one or more transmit paths (e.g., transmit path 34). One or more antennas 40 may be used to both transmit and receive signals. In these scenarios, the antenna may be coupled to communications circuitry 26 and/or long range spatial ranging circuitry 28 using both a transmit path and a receive path and, if desired, one or more components or signal paths (e.g., radio-frequency transmission lines) may be shared between both the transmit path and the receive path. While described herein as a transmit antenna for the sake of simplicity, transmit antenna 40TX may also be used in the reception of radio-frequency signals for communications circuitry 26 if desired (e.g., an additional receive path (not shown) may couple transmit antenna 40TX to communications circuitry 26). Similarly, receive antenna 40RX may also be used in the transmission of radio-frequency signals if desired. While receive antenna 40RX is only illustrated as providing reflected signals 44 to long range spatial ranging circuitry 28, receive antenna 40RX may also provide received radio-frequency signals 38 to communications circuitry 26 (e.g., receive path 36 may also couple receive antenna 40RX to communications circuitry 26).

Long range spatial ranging circuitry 28 may be used to accurately identify range R when external object 46 is at relatively far distances from device 10. However, in practice, long range spatial ranging circuitry 28 exhibits a blind spot to nearby external objects at distances less than threshold range $R_{TH}$ (e.g., around 1-2 cm) from device 10. When external object 46 is located within this blind spot (e.g., within threshold range $R_{TH}$ from transmit antenna 40TX), long range spatial ranging circuitry 28 may be unable to identify the presence, location, and/or velocity of external object 46 with a satisfactory level of accuracy. External objects 46 within threshold range $R_{TH}$ of transmit antenna 40TX may be exposed to relatively high amounts of radio-frequency energy (e.g., from the radio-frequency signals 38 and/or 42 that are transmitted by transmit antenna 40TX). In scenarios where external object 46 is a body part or person, if care is not taken, this transmitted radio-frequency energy may cause wireless circuitry 24 to exceed regulatory limits or other limits on specific absorption rate (SAR) (e.g., when the transmitted signals are at frequencies below 6 GHz) and/or maximum permissible exposure (MPE) (e.g., when the transmitted signals are at frequencies above 6 GHz). In order to detect the presence of external object 46 within threshold range $R_{TH}$ from transmit antenna 40TX, wireless circuitry 24 may include an ultra-short range (USR) object detector such as USR detector 30. USR detector 30 may serve to detect external object 46 at ultra-short ranges (e.g., at ranges within threshold range $R_{TH}$ from transmit antenna 40TX). In other words, USR detector 30 may perform external object detection within the blind spot of long range spatial ranging circuitry 28.

USR detector 30 may include a voltage standing wave ratio (VSWR) sensor (detector) such as VSWR sensor 32. VSWR sensor 32 may be interposed on transmit path 34. VSWR sensor 32 may gather VSWR values using transmit antenna 40TX. The VSWR values may include complex scattering parameter values (S-parameter values) such as reflection coefficient (return loss) values (e.g., $S_{11}$ values). The magnitude of the $S_{11}$ values (e.g., $|S_{11}|$ values) may be indicative of the amount of transmitted radio-frequency energy that is reflected in a reverse direction along transmit path 34 (e.g., in response to the presence of external object 46 at or adjacent to transmit antenna 40TX). The VSWR values gathered by VSWR sensor 32 may be insensitive to situations where external object 46 is located at distances greater than threshold range $R_{TH}$ from transmit antenna 40TX. However, the VSWR values gathered by VSWR sensor 32 may allow control circuitry 14 to identify when external object 46 is located within threshold range $R_{TH}$ from transmit antenna 40TX (e.g., within the blind spot of long range spatial ranging circuitry 28).

In this way, USR detector 30 and long range spatial ranging circuitry 28 may identify the presence of external object 46 and optionally the range R to external object 46, regardless of whether external object 46 has moved to a position that is relatively close or relatively far from device 10 over time. In addition, USR detector 30 may identify the presence of external object 46 within the blind spot of long range spatial ranging circuitry 28 so that suitable action can be taken to ensure that wireless circuitry 24 continues to satisfy any applicable SAR and/or MPE regulations. By using the same transmit antenna 40TX to both transmit radio-frequency signals 38/42 and measure VSWR, the VSWR measurements will be very closely correlated with the amount of radio-frequency energy absorbed by external object 46 from the transmitted radio-frequency signals 38/42, thereby providing high confidence in the use of USR detector 30 for meeting any applicable SAR and/or MPE regulations (e.g., greater confidence than in scenarios where proximity sensors that are separate from the transmit antenna or transmit chain are used to identify the presence of external objects within threshold range $R_{TH}$ of device 10).

Figure 2:
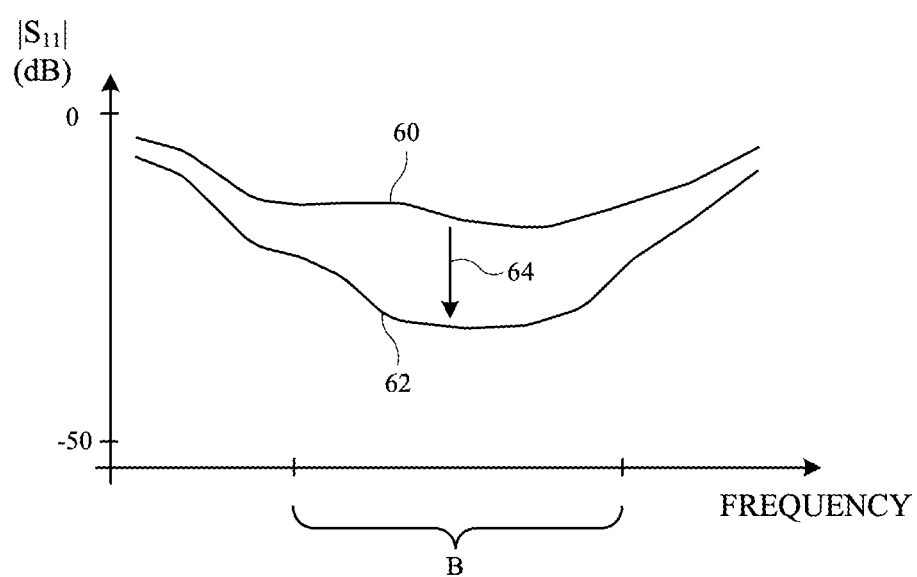
FIG. 2 is a plot of reflection coefficient as a function of frequency that may be produced by an illustrative voltage standing wave ratio (VSWR) sensor in response to the absence and presence of an external object adjacent to a transmit antenna in accordance with some embodiments.

FIG. 2 is a plot showing how VSWR measurements made by VSWR sensor 32 may change due to the presence of external object 46 adjacent to transmit antenna 40TX. Curve 60 plots the magnitude of reflection S-parameter $S_{11}$ (i.e., $|S_{11}|$) as a function of frequency in the absence of external object 46 within threshold range $R_{TH}$. As shown by curve 60, in the absence of external object 46, $|S_{11}|$ may have a relatively high value across a frequency band of interest B (e.g., the frequency band used to convey radio-frequency signals 38 or 42 of FIG. 1).

Curve 62 plots $|S_{11}|$ as a function of frequency when external object 46 is within threshold range $R_{TH}$ from transmit antenna 40TX. As shown by curve 62, $|S_{11}|$ may have a relatively low value across frequency band B due to the presence of external object 46. In general, once external object 46 is within threshold range $R_{TH}$, $|S_{11}|$ will continue to decrease, as shown by arrow 64 as the object approaches transmit antenna 40TX. Control circuitry 14 may gather VSWR values using VSWR sensor 32 (e.g., $|S_{11}|$ values such as those shown by curves 60 and 62) and may process the gathered VSWR values to identify when external object 46 is within threshold range $R_{TH}$ (e.g., by comparing the gathered Bill values to one or more threshold levels). Beyond threshold range $R_{TH}$, $|S_{11}|$ will exhibit no change or a negligible change in response to changes in distance between transmit antenna 40TX and external object 46. At these relatively far distances, long range spatial ranging circuitry 28 (FIG. 1) may be used to detect the presence, position (e.g., range R), and/or velocity of external object 46.

Figure 3:
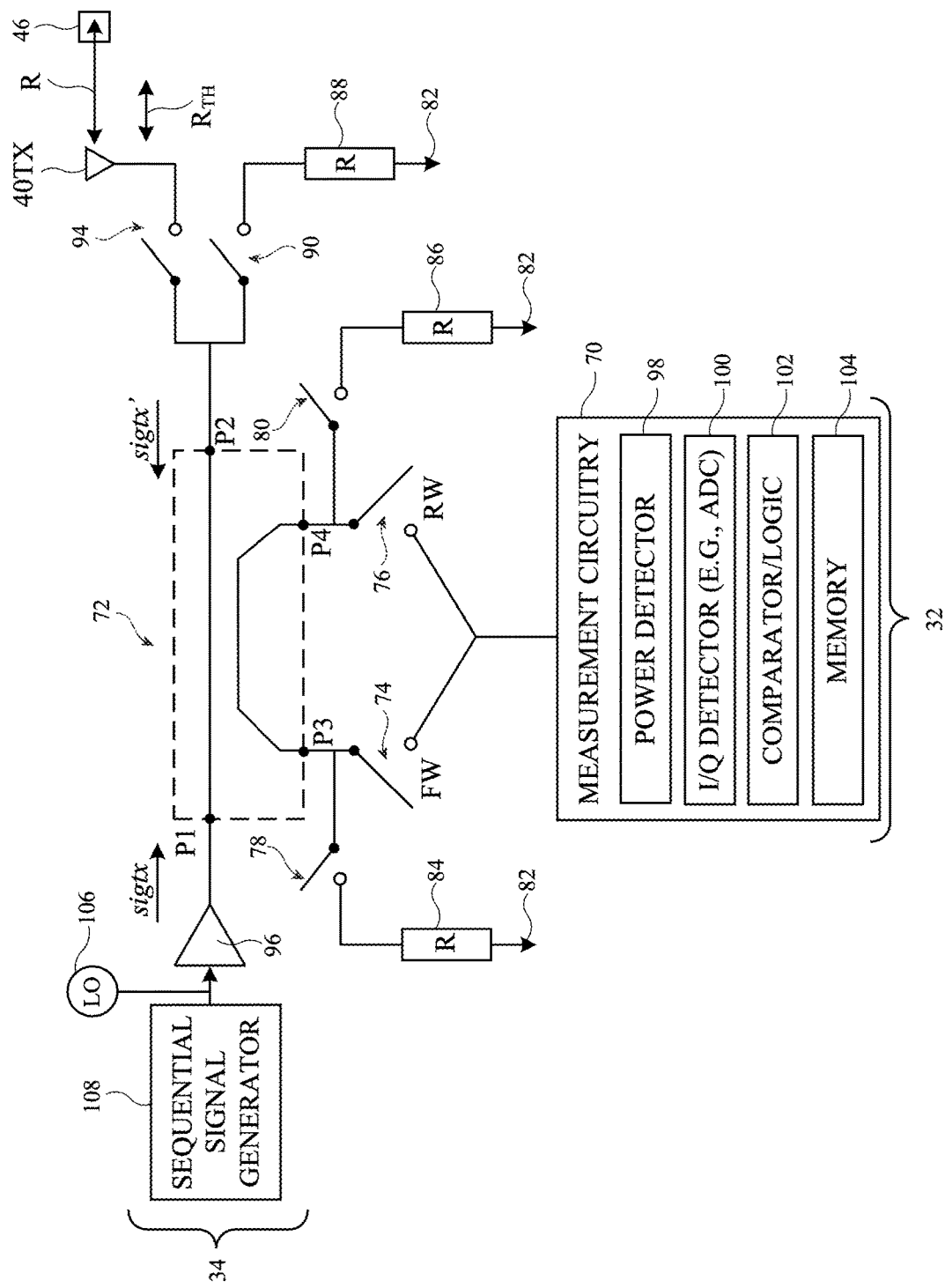
FIG. 3 is a circuit diagram of an illustrative VSWR sensor having a directional coupler for performing animate external object detection using a transmit antenna in accordance with some embodiments.

FIG. 3 is a circuit diagram showing how VSWR sensor 32 may be disposed on transmit path 34. As shown in FIG. 3, transmit path 34 may include a power amplifier (PA) such as PA 96. The input of PA 96 may be coupled to long range spatial ranging circuitry 28 and/or communications circuitry 26 of FIG. 1. The output of PA 96 may be coupled to transmit antenna 40TX via a switch such as antenna switch 94. The output of PA 96 may also be coupled to matched load 88 via a switch such as matched load switch 90. Matched load 88 may be coupled in series between matched load switch 90 and ground 82. Matched load 88, matched load switch 90, and/or antenna switch 94 may be omitted if desired.

In the example of FIG. 3, VSWR sensor 32 is a directional switch coupler. This is merely illustrative and, in general, VSWR sensor 32 may be implemented using any desired VSWR sensor architecture. As shown in FIG. 3, VSWR sensor 32 may include directional coupler 72 interposed on transmit path 34 between PA 96 and transmit antenna 40TX (e.g., along a radio-frequency transmission line in transmit path 34 coupled between the output of PA 96 and transmit antenna 40TX). Directional coupler 72 may have a first port (P1) coupled to the output of PA 96 and a second port (P2) communicably coupled to transmit antenna 40TX. Directional coupler 72 may have a third port (P3) coupled to a first termination that includes resistor 84 coupled in series between termination switch 78 and ground 82. Directional coupler 72 may also have a fourth port (P4) coupled to a second termination that includes resistor 86 coupled in series between termination switch 80 and ground 82. VSWR sensor 32 may have a forward (FW) switch 74 coupled between port P3 and measurement circuitry 70 (e.g., an amplitude and/or phase detector). VSWR sensor 32 may also have a reverse (RW) switch 76 coupled between port P4 and measurement circuitry 70.

Measurement circuitry 70 may have a control path coupled to other components in USR detector 30 or control circuitry 14 (FIG. 1) and/or some or all of measurement circuitry 70 may form a part of control circuitry 14 (e.g., the operations of some or all of measurement circuitry 70 may be performed using one or more processors). Measurement circuitry 70 may include, for example, a power detector such as power detector 98, an in-phase and quadrature-phase (I/Q) detector (e.g., an ADC), logic such as comparator/logic 102 (e.g., one or more logic gates, etc.), and/or memory such as memory 104. Memory 104 may form a part of storage circuitry 16 of FIG. 1, for example. If desired, I/Q detector 100 may be formed from one or more ADCs in receive path 36 (FIG. 1).

When performing VSWR measurements (e.g., S-parameter values such as Sri values), PA 96 may output a transmit test signal sigtx (e.g., while antenna switch 94 is closed). Test signal sigtx may be a radar transmit signal transmitted by long range spatial ranging circuitry 28 (e.g., radio-frequency signals 42 of FIG. 1), a wireless communications data transmit signal transmitted by communications circuitry 26 (e.g., radio-frequency signals 38 of FIG. 1), or a dedicated test signal for use in VSWR measurement (e.g., one or more tones transmitted by a signal generator, local oscillator, and/or other signal generation circuitry in USR detector 30 of FIG. 1). For example, a sequential signal generator 108 may be used to generate test signal sigtx. Sequential signal generator 108 may be a part of long range spatial ranging circuitry 28 (e.g., test signal sigtx may be a continuous wave or wideband that can also be used in performing long range spatial ranging operations), may be a part of communications circuitry 26 (e.g., test signal sigtx may also carry wireless communications data), or may be formed as a part of USR detector 30 that is separate from long range spatial ranging circuitry 28 and communications circuitry 26. Additionally or alternatively, a simple local oscillator such as local oscillator (LO) 106 may generate test signal sigtx.

In performing VSWR measurements, VSWR sensor 32 may perform forward path measurements and reverse path measurements using transmit signal sigtx. When performing forward path measurements, FW switch 74 is closed, RW switch 76 is open, switch 80 is closed, and switch 78 is open so that test signal sigtx is coupled off from transmit path 34 by directional coupler 72 and routed to measurement circuitry 70 through FW switch 74. Measurement circuitry 70 may measure and store the amplitude (magnitude) and/or phase of test signal sigtx for further processing (e.g., as a forward signal phase and magnitude measurement). For example, power detector 98 (e.g., a peak detector, diode and capacitor, etc.) may measure the magnitude of test signal sigtx and may store the magnitude on memory 104. As another example, I/Q detector 100 may make I/Q measurements for the forward path that are stored on memory 104.

At least some of test signal sigtx will reflect off of transmit antenna 40TX (e.g., due to impedance discontinuities between transmit path 34 and transmit antenna 40TX subject to impedance loading from any external objects at or adjacent to transmit antenna 40TX) and back towards PA 96 as reflected test signal sigtx'. When performing reverse path measurements, FW switch 74 is open, RW switch 76 is closed, switch 80 is open, and switch 78 is closed so that reflected test signal sigtx' is coupled off of transmit path 34 by directional coupler 72 and routed to measurement circuitry 70 through RW switch 76. Measurement circuitry 70 (e.g., power detector 98 or I/Q detector 100) may measure and store the amplitude (magnitude) and/or phase of reflected test signal sigtx' for further processing (e.g., as a reverse signal phase and magnitude measurement). Comparator/logic 102 and/or control circuitry 14 (FIG. 1) may process the stored forward and reverse phase and magnitude measurements to identify complex scattering parameter values such as $S_{11}$ values. The $S_{11}$ values are characterized by a scalar magnitude $|S_{11}|$ and a corresponding phase. In this way, VSWR sensor 32 may measure VSWR values (e.g., $S_{11}$ values, $|S_{11}|$ values, etc.) that can be used to determine when external object 46 is located at a range R that is less than or equal to threshold range $R_{TH}$. Long range spatial ranging circuitry 28 (FIG. 1) may also use transmit antenna 40TX to identify range R when external object 46 is located at a range R that is beyond threshold range $R_{TH}$ from transmit antenna 40TX.

It may be desirable for USR detector 30 to be able to distinguish between animate external objects 46 and inanimate external objects 46 in the vicinity of transmit antenna 40TX (e.g., within threshold range $R_{TH}$ from transmit antenna 40TX). For example, inanimate objects may not be subject to regulatory limits on SAR or MPE, whereas animate objects are likely to be human body parts that are subject to regulatory limits on SAR or MPE. If USR detector 30 is able to detect that an external object 46 present within threshold range $R_{TH}$ of transmit antenna 40TX is an inanimate object, wireless circuitry 24 may be able to continue to transmit signals over transmit antenna 40TX at relatively high transmit power levels (e.g., the maximum transmit power level of PA 96) without violating regulatory limits on SAR or MPE. This may serve to maximize the wireless performance of device 10 in performing wireless communications and/or long range spatial ranging operations relative to scenarios where the wireless circuitry has to reduce transmit power level or maximum transmit power level in the presence of any external object within threshold range $R_{TH}$ regardless of whether the external object is animate or inanimate. At the same time, if USR detector 30 is able to detect that an external object 46 present within threshold range $R_{TH}$ of transmit antenna 40TX is an animate object, wireless circuitry 24 may have relatively high confidence that the external object is a body part subject to SAR/MPE limits and may therefore reduce the transmit power level or the maximum transmit power level for transmit antenna 40TX to ensure that regulatory limits on SAR or MPE are satisfied.

Figure 4:
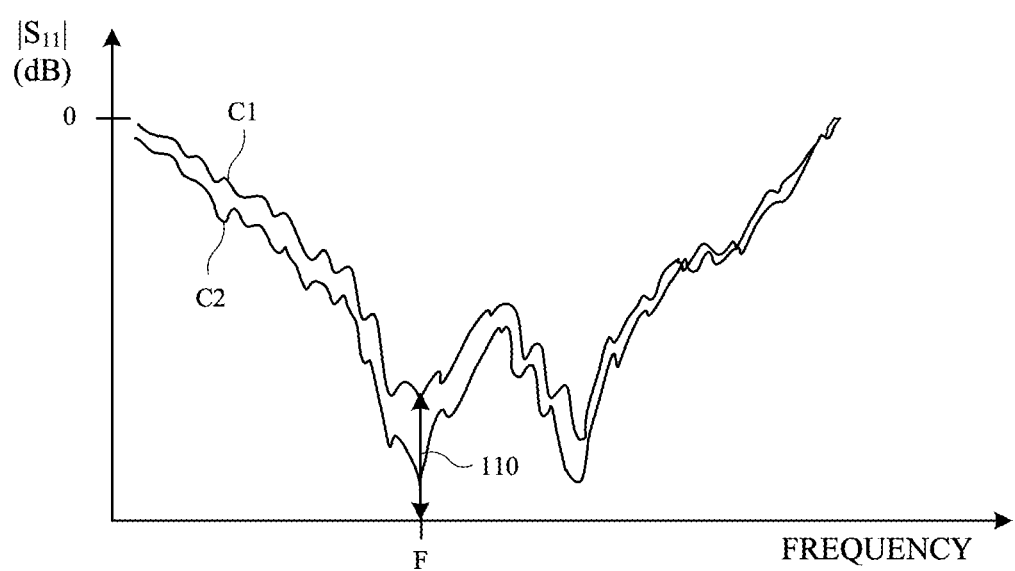
FIG. 4 is a plot showing how the reflection coefficient measured by an illustrative VSWR sensor may vary at different times when an animate object is present adjacent to a transmit antenna in accordance with some embodiments.

If desired, control circuitry 14 (FIG. 1) may use variations in the VSWR measurements performed by VSWR sensor 32 over time to determine whether an external object 46 adjacent to transmit antenna 40TX is animate or inanimate. FIG. 4 is a plot showing how VSWR measurements (e.g., $|S_{11}|$ values) performed by VSWR sensor 32 may vary over time in the presence of an external object adjacent to transmit antenna 40TX.

Curve C1 of FIG. 4 illustrates $|S_{11}|$ values that may be generated by measurement circuitry 70 (FIG. 3) at different frequencies and at a first time (e.g., in response to test signals sigtx that are swept over a range of frequencies). Curve C2 illustrates $|S_{11}|$ values that may be generated by measurement circuitry 70 at different frequencies and at a second time. As shown by curves C1 and C2, the $|S_{11}|$ measurements gathered by measurement circuitry 70 may vary at a given frequency F by difference (variation) 110 between the first and second times. In general, animate objects will produce more variation in the $|S_{11}|$ measurements at a given frequency over time than inanimate objects. Control circuitry 14 may therefore gather a sufficient number of VSWR measurements over time, may process the VSWR measurements to identify differences (variations) in the VSWR measurements over time (e.g., differences such as difference 110 of FIG. 4), and may process the identified differences to determine whether external object 46 is inanimate or animate. The example of FIG. 4 is merely illustrative and, in practice, curves C1 and C2 may have other shapes.

Some examples of inanimate objects 46 that may be present adjacent to transmit antenna 40TX include furniture, tabletops, desktops, vehicle dashboards, or removable device cases (e.g., removable plastic cases, rubber cases, leather cases, cases with a combination of materials, etc.) for device 10. If desired, control circuitry 14 may also use the identified differences (variations) in VSWR measurements over time to determine whether device 10 has been placed within a removeable case (e.g., to determine whether external object 46 is a removable case for device 10). Since different users will place device 10 into different types of removable cases having different dielectric properties, control circuitry 14 may further determine what type of removable case is present and/or the effects of the removable case for calibrating other device operations if desired. For example, control circuitry 14 may use the presence of the removable case and/or information about the type of removable case that is present to calibrate subsequent radar operations performed by long range spatial ranging circuitry 28 (e.g., to adjust estimates of range R to account for the path loss effects of the transmitted and received signals which have to pass through the removable case), to adjust the impedance matching and/or tuning of transmit antenna 40TX (e.g., to compensate for dielectric loading by the removable case to minimize signal reflections at the transmit antenna and so that the transmit antenna is not undesirably detuned away from its desired operating frequency), to adjust future VSWR measurements, etc.

Figure 5:
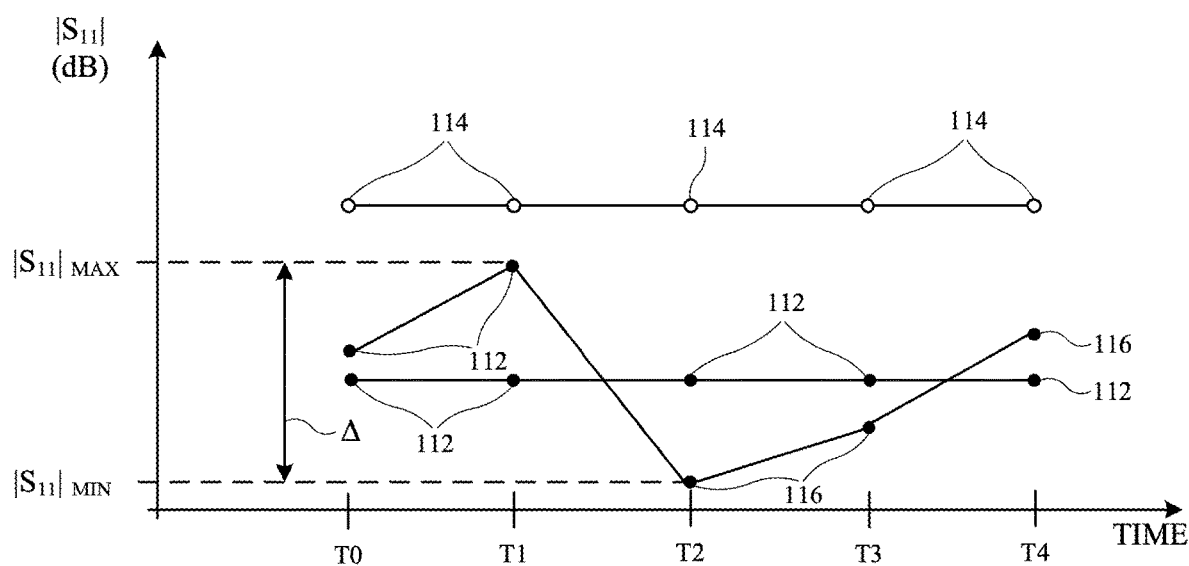
FIG. 5 is a plot showing how the reflection coefficient measured by an illustrative VSWR sensor may vary as a function of time in the presence of an inanimate external object, in the presence of an animate external object, and in the presence of no external object adjacent to a transmit antenna in accordance with some embodiments.

FIG. 5 is a plot of different reflection coefficient (return loss) magnitude measurements ($|S_{11}|$ values) that may be made by VSWR sensor 32 as a function of time in the presence of different types of external objects 46. Points 114 of FIG. 5 illustrate $|S_{11}|$ measurements made by VSWR sensor 32 in the absence of any external objects (e.g., at five different sampling times such as times T0, T1, T2, T3, and T4). Points 114 may, for example, be predetermined points that are generated during factory calibration of device 10. As shown by points 114, there is relatively little variation in $|S_{11}|$ (e.g., no variation) as a function of time in the absence of external objects.

Points 112 illustrate $|S_{11}|$ measurements that may be made by VSWR sensor 32 at times T0-T4 in the presence of an inanimate object adjacent to transmit antenna 40TX. The inanimate object may be, for example, a removable case for device 10. As shown by points 112, there is relatively little variation in $|S_{11}|$ as a function of time in the presence of an inanimate object such as a removable device case. Control circuitry 14 may compare points 112 to predetermined points 114 to determine that an inanimate object such as a removable device case is present. If desired, control circuitry 14 may compare points 114 to other predetermined points that are known to be associated with different types of removable device cases (e.g., predetermined points stored on device 10 during factory calibration in the presence of the different types of removable cases) to identify the type of removable device case that is present.

Points 116 illustrate $|S_{11}|$ measurements that may be made by VSWR sensor 32 at times T0-T4 in the presence of an animate object adjacent to transmit antenna 40TX. The animate object may be, for example, a body part. As shown by points 116, there is a relatively high amount of variation in $|S_{11}|$ as a function of time in the presence of an animate object such as a body part (e.g., due to minute movements of the external object relative to static/inanimate objects such as a removable device case). Control circuitry 14 may perform animate object detection by performing $|S_{11}|$ measurements at different times (e.g., times T0-T4) to produce points such as points 114, 112, or 116 of FIG. 5. Control circuitry 14 may identify variations in the $|S_{11}|$ measurements over time to determine whether an external object adjacent to transmit antenna 40TX is an inanimate object (and if so, whether the inanimate object is a device case and optionally the type of device case) or an animate object that is subject to regulatory limits on SAR/MPE.

Control circuitry 14 may perform animate object detection based on any desired metric for the variation of VSWR (e.g., $|S_{11}|$) measurements over time. For example, control circuitry 14 may perform animate object detection based on the difference between the maximum $|S_{11}|$ value and the minimum Bill value measured at each of the sampling times. For points 116, control circuitry 14 may identify (e.g., compute, calculate, generate, determine, etc.) a difference value Δ that is equal to the difference between the maximum $|S_{11}|$ value $|S_{11}|$MAX of points 116 (e.g., as measured at time T1) and the minimum $|S_{11}|$ value $|S_{11}|$MIN of points 116 (e.g., as measured at time T2). For points 112, this difference value is relatively small (or zero in scenarios where each point 112 is at the same IS ill). Control circuitry 14 may compare difference value Δ to one or more threshold values to determine whether the external object is animate or animate (e.g., if difference value Δ exceeds the threshold value, control circuitry 14 may determine that the external object is animate). This example is merely illustrative and, in general, control circuitry 14 may identify any desired metric of variance in $|S_{11}|$ for comparison to one or more threshold values in determining whether the external object is animate or inanimate. As another example, control circuitry 14 may identify the mean and variance of the Bill measurements over time, the rate of change of $|S_{11}|$ measurements over time, and/or any other desired variation metrics for comparison to one or more threshold values for determining whether the external object is animate or inanimate.

The example of FIG. 5 is merely illustrative. Points 114, 116, and 112 may have other values in practice. In the example of FIG. 5, five sampling times T0-T4 are used to identify variations in $|S_{11}|$ for performing animate object detection. This is merely illustrative and, in general, any desired number n of sampling times may be used to identify variations in $|S_{11}|$ for performing animate object detection. Each sampling time may be separated by 10 ms, 20 ms, 1-20 ms, more than 20 ms, 10-50 ms, or any other desired period. The sampling times need not be evenly spaced.

Figure 6:
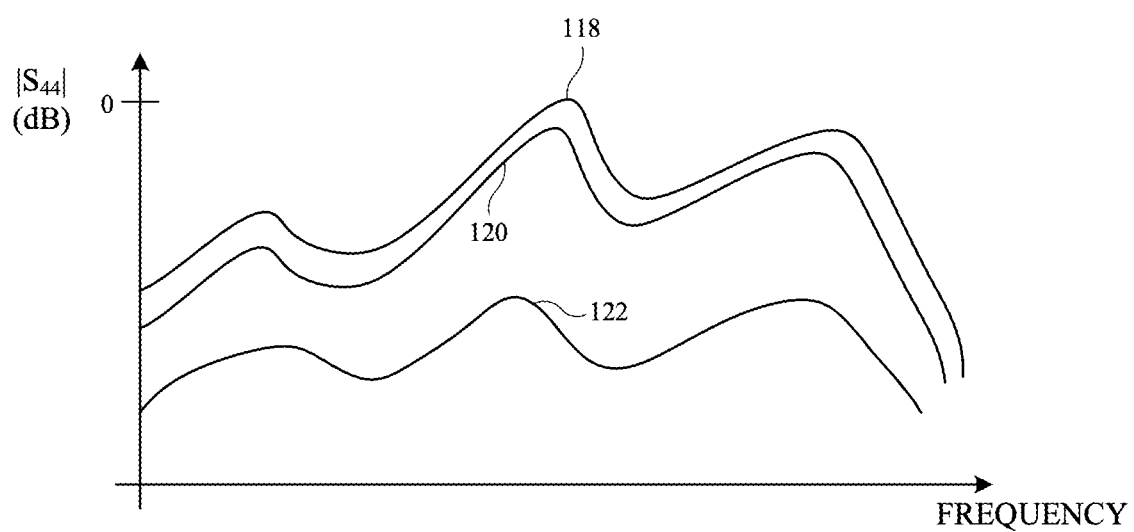
FIG. 6 is a plot showing how the return loss measured by an illustrative VSWR sensor may vary when the electronic device is provided with different types of removable cases in accordance with some embodiments.

FIG. 6 is a plot of return loss (e.g., $|S_{44}|$) as a function of frequency illustrating the effects of different removable cases on VSWR measurements by VSWR sensor 32. Curve 122 plots $|S_{44}|$ in the absence of a removable case and any other external object. Curve 118 plots $|S_{44}|$ in the presence of a first type of removable case (e.g., a removable case made from a first material, having a first thickness, etc.). Curve 120 plots $|S_{44}|$ in the presence of a second type of removable case (e.g., a removable case made from a second material, having a second thickness, etc.).

As shown by curves 122, 120, and 118, the presence of a removable case causes a shift in the magnitude of the VSWR measurements made by VSWR sensor 32 (also shown by the difference between points 112 and points 114 of FIG. 5). As shown by curves 120 and 118, different types of cases may have different effects on the VSWR measurements made by VSWR sensor 32. However the same variations in VSWR measurements are made in the presence of either type of removable case or in the absence of any external object as a function of time (e.g., as shown by points 114 or 112 of FIG. 5). Control circuitry 14 may compare the VSWR measurements to expected VSWR measurements associated with different removable case types (e.g., curves 118 and 120) to identify what type of removable case is present on device 10 if desired. In other words, control circuitry 14 may compare variations in the VSWR measurements over time to one or more thresholds for performing animate object detection and may further compare the magnitude of the VSWR measurements (or the magnitude of an average of the VSWR measurements) to one or more thresholds for performing removable case detection and identification. The example of FIG. 6 is merely illustrative. Curves 118-122 may have other shapes in practice.

Figure 7:
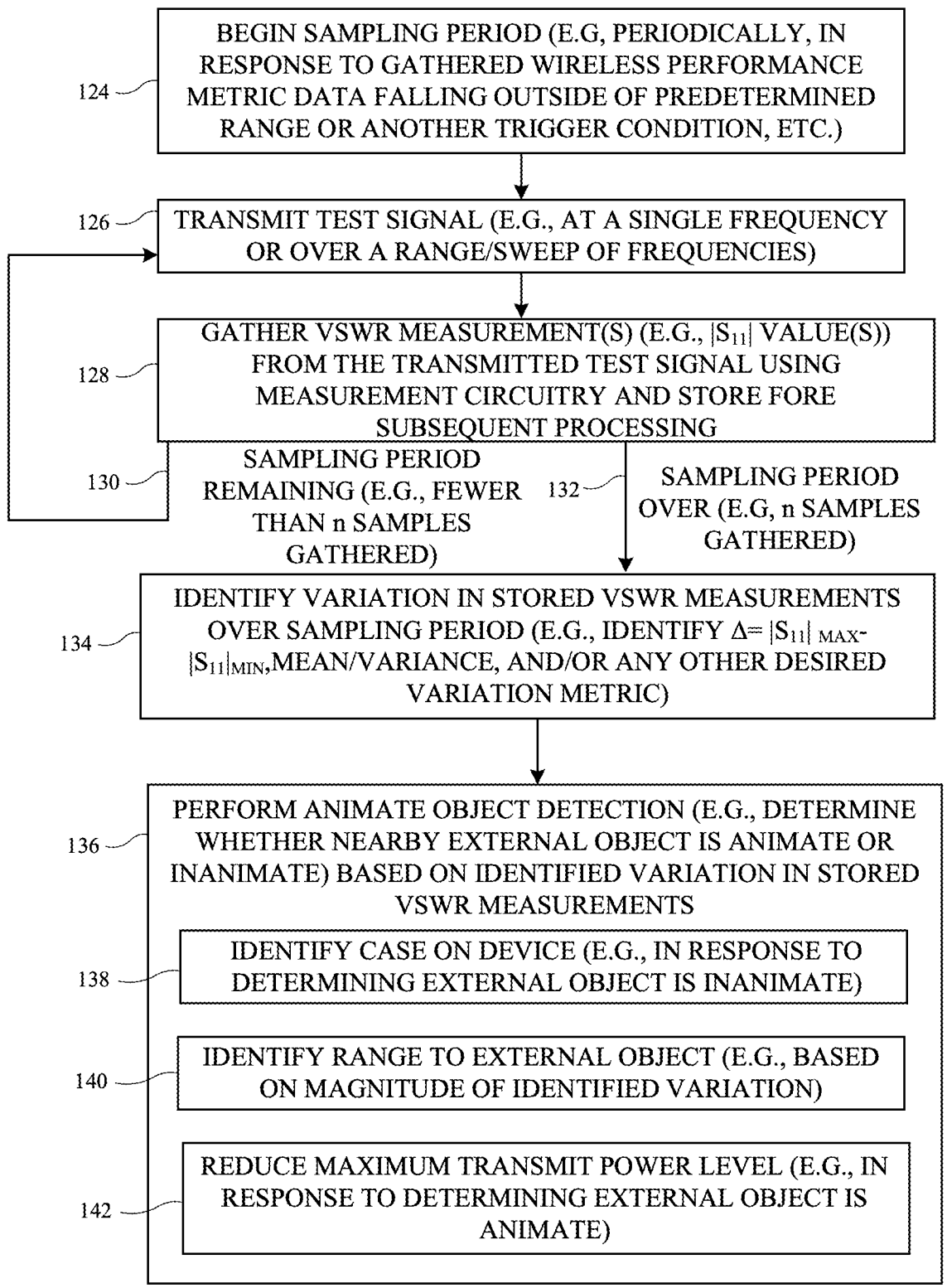
FIG. 7 is a flow chart of illustrative operations involved in gathering VSWR measurements with a VSWR sensor for use in performing animate object detection in accordance with some embodiments.

FIG. 7 is flow chart of illustrative operations involved in using VSWR sensor 32 to determine whether external objects adjacent to transmit antenna 40TX are animate or inanimate. At operation 124, a given sampling period in which VSWR sensor 32 performs VSWR measurements (samples) for performing animate object detection may begin. The sampling period may begin periodically (e.g., at a predetermined time, between other scheduled communications or signal transmissions, etc.) or may begin in response to a trigger condition. The sampling period may begin, for example, once VSWR sensor 32 has already detected that external object 46 has passed within threshold range $R_{TH}$ of transmit antenna 40TX (e.g., once VSWR measurements such as $|S_{11}|$ measurements reach a predetermined threshold value).

As another example, the sampling period may begin once device 10 has determined that gathered wireless performance metric data has fallen outside of a predetermined range. In this example, wireless circuitry 24 may gather wireless performance metric data associated with the radio-frequency performance of transmit antenna 40TX and/or receive antenna 40RX. The wireless performance metric data may include signal-to-noise ratio (SNR) data, receive signal strength indicator (RSSI) data, or any other desired performance metric data gathered during the transmission of radio-frequency signals 38, the transmission of radio-frequency signals 42, the reception of radio-frequency signals 38, and/or the reception of reflected signals 44 of FIG. 1, for example. Control circuitry 14 may compare the gathered wireless performance metric data with a predetermined range of wireless performance metric values associated with satisfactory radio-frequency performance and/or the operation of wireless circuitry 24 in the absence of external objects within threshold range $R_{TH}$ (e.g., a predetermined range of satisfactory RSSI values, SNR values, etc.). The predetermined range of wireless performance metric values may be characterized by an upper threshold limit or value and/or a lower threshold limit or value.

The wireless performance metric data may serve as a coarse indicator for whether external object 46 is within threshold range $R_{TH}$. For example, if external object 46 is within range $R_{TH}$, external object 46 may partially block or cover one or more antennas 40 (thereby preventing the antenna from properly receiving radio-frequency signals), may undesirably load or detune one or more antennas 40 in device 10, etc. When the gathered wireless performance metric data falls outside of the predetermined range, this may be indicative of the potential presence of external object 46 within threshold range $R_{TH}$. However, when the gathered wireless performance metric data falls within the predetermined range, this may indicate that it is very unlikely that there is an external object present within threshold range $R_{TH}$ (e.g., because wireless circuitry 24 is performing nominally as expected in the absence of an external object within threshold range $R_{TH}$). If the gathered wireless performance metric data falls within the predetermined range (thereby indicating that there is no external object within threshold range $R_{TH}$), VSWR sensor 32 may gather background VSWR measurements for performing background cancellation if desired.

VSWR sensor 32 may make n VSWR measurements such as $|S_{11}|$ measurements (sometimes referred to herein as samples) during any given sampling period. Each of the n VSWR measurements may occur at a corresponding sampling time within the sampling period (e.g., at times T0-T4 of FIG. 5). The sampling period may be any desired length (e.g., n may be any desired integer such as 2, between 3-5, between 5-10, between 10-20, 100, more than 100, more than 10, more than 20, more than 5, more than 2, etc.).

At operation 126, wireless circuitry 24 (e.g., sequential signal generator 108 or LO 106 of FIG. 3) may transmit test signal sigtx over transmit path 34. Test signal sigtx may be transmitted at a single frequency (e.g., a single tone), at multiple frequencies (e.g., as a dual tone or multiple tones), or may be swept over a range of frequencies. Transmit antenna 40TX may transmit test signal sigtx. If desired, transmit antenna 40TX may forego transmission of test signal sigtx (e.g., antenna switch 94 of FIG. 3 may be open).

At operation 128, VSWR sensor 32 may perform a VSWR measurement (e.g., may gather an $|S_{11}|$ value) from the transmitted test signal sigtx (or multiple VSWR measurements in scenarios where test signal sigtx is swept over a range of frequencies) and may store the VSWR measurement(s) for subsequent processing (e.g., on memory 104 of FIG. 3). This measurement may occur at a corresponding sampling time within the sampling period (e.g., one of times T0-T4 of FIG. 5). If the full sampling period has not yet elapsed (e.g., if fewer than n samples or iterations of operations 126-128 have taken place for the current sampling period), processing may loop back to operation 126 via path 130. Each iteration of operations 126-128 may take a corresponding duration or period to perform (e.g., 10 ms, 20 ms, 1-20 ms, more than 20 ms, etc.). Each VSWR measurement (e.g., each iteration of operation 128) may therefore be separated in time, thereby allowing VSWR measurements to be made over time (e.g., over the sampling period) for identifying variations in the VSWR measurements over time for subsequent processing.

If the sampling period has elapsed (e.g., once n samples or iterations of operations 126-128 have taken place), processing may proceed from operation 128 to operation 134 via path 132. At operation 134, control circuitry 14 (e.g., comparator/logic 102 of FIG. 3 or other control circuitry separate from measurement circuitry 70 of FIG. 3) may identify an amount of variation over time in the VSWR measurements gathered and stored during the sampling period. For example, control circuitry 14 may identify a variation metric such as difference value Δ for the VSWR measurements, which is equal to the difference between the maximum stored $|S_{11}|$ value (e.g., $|S_{11}|$MAX of FIG. 5) and the minimum stored $|S_{11}|$ value (e.g., $|S_{11}|$MIN of FIG. 5)

from the sampling period. This is merely illustrative and, in general, control circuitry 14 may identify other variation metrics such as the mean and variance of the stored $|S_{11}|$ values if desired.

At operation 136, control circuitry 14 may perform animate object detection based on the identified variation in the VSWR measurements gathered and stored during the sampling period. For example, control circuitry 14 may compare the identified variation (e.g., difference value Δ) to one or more threshold values indicative of whether external object 46 is animate or inanimate. The animate object detection may allow control circuitry 14 to distinguish between external objects 46 that are inanimate, such as a tabletop or removable case, from external objects 46 that are animate, such as a body part of the user of device 10 or other persons.

If desired, control circuitry 14 may process the VSWR measurements gathered and stored during the sampling period to identify whether a removable case is present on device 10 and to optionally identify what type of removable case is present on device 10 (at operation 138). These case detection operations may be performed in response to identifying that external object 46 is an inanimate object, for example.

If desired, control circuitry 14 may identify a range to external object 46 based on the identified variation in the VSWR measurements gathered and stored during the sampling period (at operation 140). Control circuitry 14 may, for example, compare the identified variation to one or more threshold values indicative of the presence of external object 46 at different ranges within threshold range $R_{TH}$.

If desired, control circuitry 14 may reduce the transmit power level of antenna 40TX, may reduce the maximum transmit power level of antenna 40TX (e.g., the upper limit or cap on transmit power levels used by antenna 40TX), may switch a different transmit antenna into use, and/or may disable transmit antenna 40TX in response to determining that external object 46 is an animate object. This may ensure that animate external objects, which are possibly or even likely human body parts, are not exposed to excessive radio-frequency energy, thereby ensuring that device 10 continues to satisfy any regulatory limits on SAR or MPE.

The example of FIG. 7 is merely illustrative. Operations 138, 140, and/or 142 may be omitted. Control circuitry 14 may perform any other desired operations in response to the detection of an animate external object or an inanimate external object adjacent transmit antenna 40TX. If desired, control circuitry 14 may increase the transmit power level, may increase the maximum transmit power level, and/or may switch transmit antenna 40TX into use in response to determining that external object 46 is an inanimate object.

Figure 8:
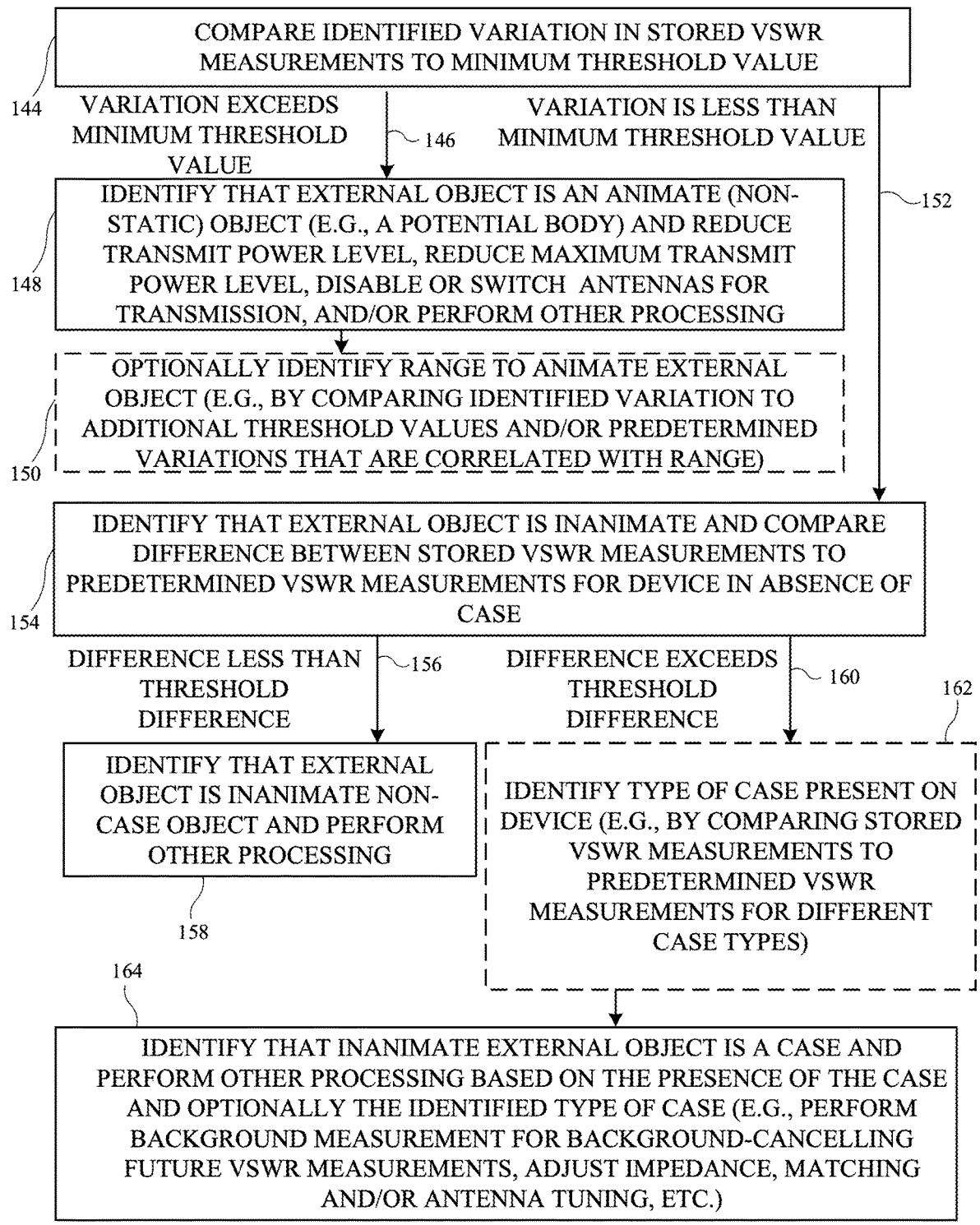
FIG. 8 is a flow chart of illustrative operations involved in performing animate object detection based on variations in VSWR measurements gathered by a VSWR sensor in accordance with some embodiments.

FIG. 8 is a flow chart of illustrative operations involved in performing animate object detection. The operations of FIG. 8 may be performed by control circuitry 14 (e.g., one or more processors separate from and/or including portions of measurement circuitry 70 of FIG. 3) in performing operation 136 of FIG. 7, for example.

At operation 144 of FIG. 8, control circuitry 14 may compare the identified variation in VSWR measurements for the sampling period to a minimum variation threshold value. For example, control circuitry 14 may compare difference value Δ to the minimum variation threshold value. If the identified variation (e.g., difference value Δ) exceeds the minimum variation threshold value (e.g., if there is a sufficient amount of variation in $|S_{11}|$ over the sampling period), processing may proceed to operation 148 via path 146.

At operation 148, control circuitry 14 may identify that external object 46 is an animate (non-static) external object (e.g., because the relatively high amount of variation in $|S_{11}|$ values gathered over the sampling period is indicative of an external object that moves at least slightly adjacent transmit antenna 40TX, which is characteristic of a possible human body part). If desired, control circuitry 14 may reduce the transmit power level of transmit antenna 40TX, may reduce the maximum transmit power level of transmit antenna 40TX, may disable transmit antenna 40TX, may switch a different transmit antenna into use, and/or may perform any other desired processing in response to determining that external object 46 is an animate object (e.g., software applications running on device 10 may use the presence of an animate object adjacent to the device as a control input, etc.). This may ensure that device 10 continues to satisfy regulatory limits on SAR/MPE given the potential (or likely) presence of a body part near to transmit antenna 40TX.

At optional operation 150, control circuitry 14 may identify the range to external object 46 based on the identified variation in stored VSWR measurements. For example, the amount of variation in the stored VSWR measurements may be correlated to the range between the animate external object and transmit antenna 40TX. Control circuitry 14 may compare the identified variation (e.g., difference value Δ) to one or more additional threshold values indicative of the animate external object being located at different distances from transmit antenna 40TX to identify the range between device 10 and the animate external object. Control circuitry 14 may use the identified range for any other desired processing or application tasks. Optional operation 150 may be omitted if desired.

If the identified variation (e.g., difference value Δ) is less than the minimum variation threshold value (e.g., if there is an insufficient amount of variation in $|S_{11}|$ over the sampling period), processing may proceed from operation 144 to operation 154 via path 152. At operation 154, control circuitry 14 may identify that external object 46 is an inanimate (static) external object (e.g., because the relatively low amount of variation in $|S_{11}|$ values gathered over the sampling period is indicative of an external object that does not move, unlike a human body part). If desired, control circuitry 14 may forego decreasing the transmit power level or the maximum transmit power level of transmit antenna 40TX. In other words, control circuitry 14 may maintain the current maximum transmit power level of transmit antenna 40TX or may increase the maximum transmit power level of transmit antenna 40TX. If desired, control circuitry 14 may increase the transmit power level of transmit antenna 40TX, may switch transmit antenna 40TX into use, and/or may perform any other desired processing in response to determining that external object 46 is an inanimate object (e.g., software applications running on device 10 may use the presence of an inanimate object adjacent to the device as a control input, etc.). This may help to maximize the radio-frequency performance of wireless circuitry 24 in performing wireless communications and/or long range spatial ranging operations (e.g., maximizing throughput, signal quality, signal-to-noise ratio, etc.) relative to scenarios where transmit power level or maximum transmit power level is reduced for all external objects 46 within threshold range $R_{TH}$ regardless of whether the external object is animate or inanimate. Because the inanimate object is not a human body part, omitting a reduction in transmit power level or maximum transmit power level will not cause device 10 to exceed regulatory limits on SAR/MPE.

If desired, control circuitry 14 may also perform case detection at operation 154. For example, control circuitry 14 may compare one or more of the stored VSWR measurements (or an average of the stored VSWR measurements) to one or more predetermined VSWR measurements (e.g., $|S_{11}|$ values) stored on device 10 to determine whether a removable case is present on device 10. The predetermined VSWR measurements may be, for example, expected VSWR measurements gathered for device 10 (e.g., during factory calibration) in the absence of any external objects or a removable case (e.g., one or more of points 114 or an average of points 114 of FIG. 5).

If the difference between the stored VSWR measurement(s) and the predetermined VSWR measurement(s) is less than a threshold difference value (or if the stored VSWR measurements are otherwise sufficiently similar to the predetermined VSWR measurements), processing may proceed to operation 158 via path 156. At operation 158, control circuitry 14 may identify that the inanimate external object is not a removable case or is not present adjacent transmit antenna 40TX. However, if the difference between the stored VSWR measurement(s) and the predetermined VSWR measurement(s) exceeds the threshold difference value (or if the stored VSWR measurements are sufficiently dissimilar to the predetermined VSWR measurements), processing may proceed to optional operation 162 via path 160.

At optional operation 162, control circuitry 14 may identify a type of removable case present on device 10. For example, control circuitry 14 may compare one or more of the stored VSWR measurements (e.g., an average of the stored VSWR measurements, the VSWR measurements as a function of frequency) to one or more predetermined VSWR measurements stored on device 10 to determine the type of removable case present. These predetermined VSWR measurements may be, for example, expected VSWR measurements gathered for device 10 (e.g., during factory calibration) while placed into a variety of different removable case types. As an example, control circuitry 14 may compare the stored VSWR measurements to curves such as curves 118 and 120 of FIG. 6 to determine whether the removable cases associated with curves 118 or 120 are present on device 10. If desired, operation 162 may be combined with operation 154 (e.g., control circuitry 14 may compare the stored VSWR measurements to the predetermined VSWR measurements associated with different types of removable cases and, if the VSWR measurements are not sufficiently similar to any of the predetermined VSWR measurements, processing may proceed from operation 154 to operation 158). Operation 162 may be omitted if desired.

At operation 164, control circuitry 14 may identify that the inanimate external object is a removable device case (and optionally the type of removable device case). Control circuitry 14 may perform additional processing based on the detected presence of the removable device case and/or the identified type of case. For example, control circuitry 14 may use VSWR sensor 32 to gather background VSWR measurements in the absence of other external objects within threshold range $R_{TH}$, where the background VSWR measurements take into account the presence of the removable device case. Control circuitry 14 may then use the background VSWR measurements to perform background cancellation on subsequent VSWR measurements that are gathered in the presence of another external object within threshold range $R_{TH}$ while device 10 is placed within the removable case (e.g., by subtracting the background VSWR measurements from the subsequent VSWR measurements). In other words, VSWR detector 32 may perform VSWR background cancellation based on the detected presence of the removable device case on device 10. As another example, control circuitry 14 may control the impedance matching and/or antenna tuning of transmit antenna 40TX based on the presence of the removable device case and optionally the type of removable device case (e.g., to compensate for impedance loading or detuning of the antenna on account of the presence of the removable device case). As yet another example, control circuitry 14 may use the presence of the removable case and optionally the type of removable case to calibrate long range spatial ranging operations performed using transmit antenna 40TX (e.g., to compensate for path delay effects of the transmitted and/or reflected signals passing through the removable case).

Figure 9:
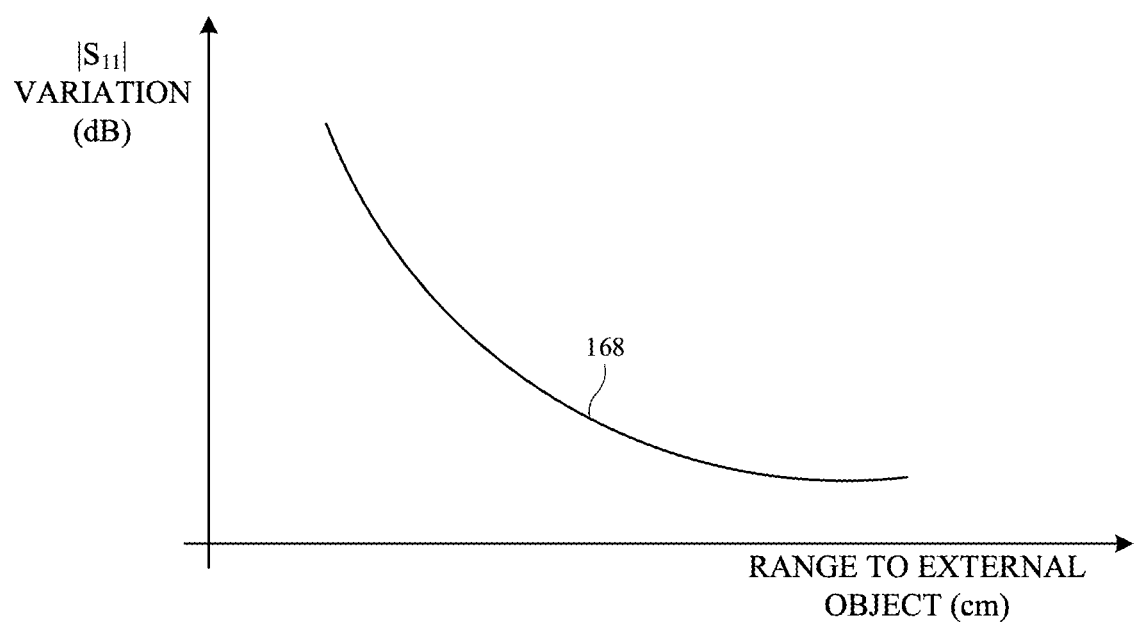
FIG. 9 is a plot showing how reflection coefficient variation may be correlated to the range between a transmit antenna and an external object in accordance with some embodiments.

Curve 168 of FIG. 9 shows one example of how variation in $|S_{11}|$ may be correlated with the range between the external object and transmit antenna 40TX. If desired, control circuitry 14 may compare the identified variation in the stored VSWR measurements to curve 168 to identify the corresponding range between the external object and transmit antenna 40TX (e.g., while processing operation 150 of FIG. 8). Curve 168 may be stored on device 10 (e.g., during factory calibration, manufacture, assembly, testing, etc.). The example of FIG. 9 is merely illustrative and, in practice, curve 168 may have other shapes.

Figure 10:
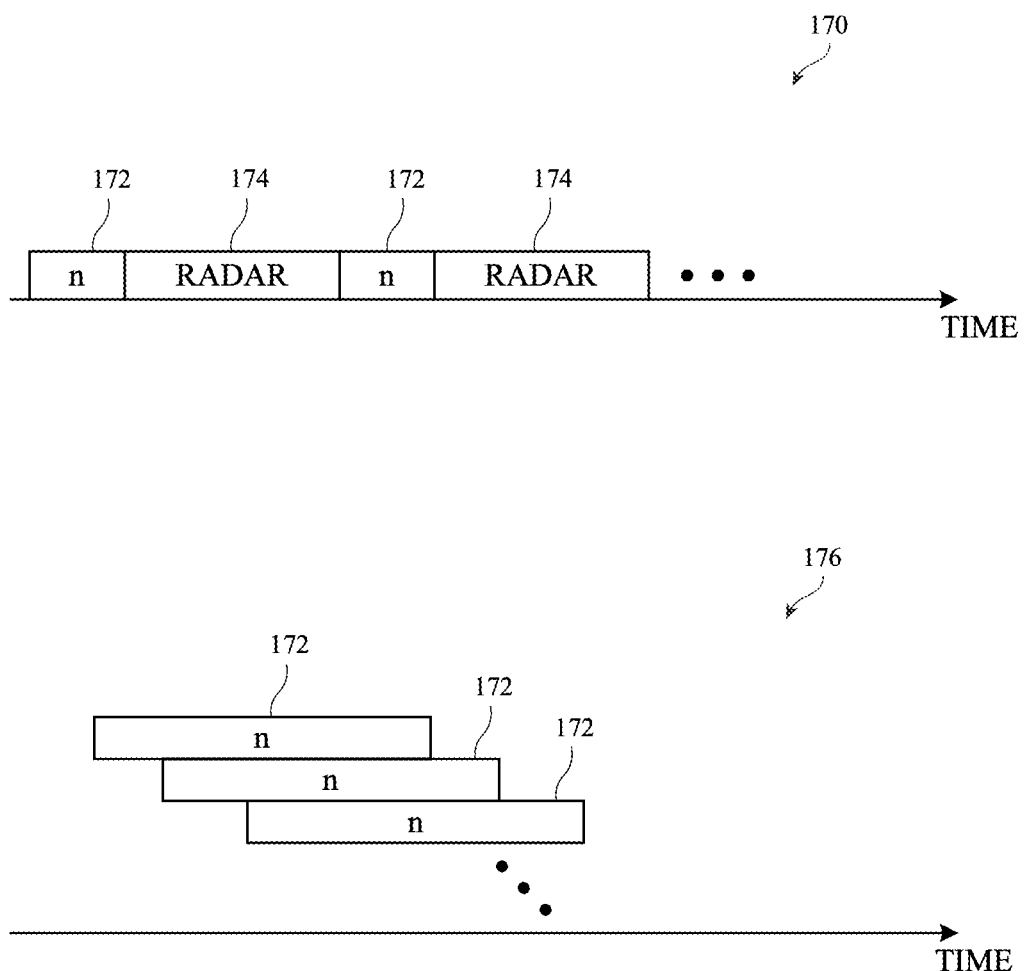
FIG. 10 shows illustrative timing diagrams for gathering VSWR measurements using a VSWR sensor for performing animate object detection in accordance with some embodiments.

FIG. 10 shows two exemplary timing diagrams for performing VSWR measurements for use in performing animate object detection. Timing diagram 170 illustrates one arrangement in which VSWR measurements for performing animate object detection are time-interleaved (time-multiplexed) with other transmit operations. During sampling periods 172, control circuitry 14 may perform n iterations of operations 126 and 128 of FIG. 7. The n VSWR measurements during each sampling period 172 may be processed to identify a corresponding variation and the variation may be processed to determine whether external object 46 is animate or inanimate (e.g., while processing operations 134-136). During periods 174, transmit antenna 40TX may be used to transmit other signals such as radar signals for performing long term spatial ranging or wireless communications signals. Operations 134-136 of FIG. 7 may be performed during each sampling period 172 or may, if desired, extend into the subsequent period 174.

Timing diagram 176 illustrates another arrangement in which VSWR measurements for performing animate object detection are performed during rolling sampling periods 172. As shown by timing diagram 176, each sampling period for identifying variation in VSWR measurements may include a subset of the samples from the previous sampling period as well as additional samples after the previous sampling period has elapsed. This may allow wireless circuitry 24 to continuously determine whether external object 46 is animate or inanimate, for example. The examples of FIG. 10 are merely illustrative. The timing arrangements of timing diagrams 170 and 176 may be combined if desired. The signals transmitted during periods 174 may be used as test signal sigtx if desired (e.g., separate sampling periods 172 may be omitted). Other timing arrangements for sampling period 172 may be used if desired.

The methods and operations described above in connection with FIGS. 1-10 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. The components of FIGS. 1 and 3 may be implemented using hardware (e.g., circuit components, digital logic gates, etc.) and/or using software where applicable.

The foregoing is merely illustrative and various modifications can be made to the described embodiments. The foregoing embodiments may be implemented individually or in any combination.

What is claimed is:

1. An electronic device operable in an environment that includes an external object, the electronic device comprising:
    an antenna;
    a transmitter coupled to the antenna over a radio-frequency transmission line path, the transmitter being configured to transmit radio-frequency signals to another electronic device using the antenna and the radio-frequency transmission line path;
    a voltage standing wave ratio (VSWR) sensor disposed on the radio-frequency transmission line path, the VSWR sensor being configured to perform VSWR measurements using the radio-frequency signals transmitted by the transmitter;
    radar circuitry communicably coupled to the antenna and configured to detect a range to the external object based on a radar signal transmitted by the antenna and received by the radar circuitry; and
    one or more processors configured to calibrate the detected range to compensate for a path loss associated with a removable case detected based on the VSWR measurements.

2. The electronic device of claim 1, wherein the one or more processors being further configured to reduce a maximum transmit power level of the antenna based on the VSWR measurements.

3. The electronic device of claim 2, the one or more processors being further configured to increase the maximum transmit power level of the antenna based on the VSWR measurements.

4. The electronic device of claim 1, the one or more processors being further configured to detect the removable case based on a magnitude of the VSWR measurements.

5. The electronic device of claim 4, wherein the VSWR sensor is configured to perform a background VSWR measurement in response to the one or more processors determining that the external object is the removable case, the one or more processors being further configured to background-cancel subsequent VSWR measurements by the VSWR sensor based on the background VSWR measurement.

6. The electronic device of claim 1, the one or more processors being further configured to identify a range between the external object and the antenna based on a variation in the VSWR measurements.

7. The electronic device of claim 1, wherein the radar circuitry comprises a sequential signal generator and the sequential signal generator is configured to generate the radar signal.

8. The electronic device of claim 1, the one or more processors being further configured to:
    compare a variation in the VSWR measurements to a threshold value;
    determine that the external object is animate when the identified variation in the VSWR measurements exceeds the threshold value; and
    determine that the external object is inanimate when the identified variation in the VSWR measurements is less than the threshold value.

9. A method of operating an electronic device, the method comprising:
    with a signal generator, transmitting radio-frequency signals during a sampling period over a radio-frequency transmission line communicably coupled to an antenna;
    with a voltage standing wave ratio (VSWR) sensor disposed along the radio-frequency transmission line, performing VSWR measurements from the radio-frequency signals transmitted over the radio-frequency transmission line during the sampling period;
    with one or more processors, detecting a removable case on the electronic device based on the VSWR measurements;
    with radar circuitry, transmitting and receiving a radar signal using the antenna;
    with one or more processors, detecting a range to an external object based on the transmitted and received radar signal; and
    with the one or more processors, calibrating the detected range to compensate for a path loss associated with the removable case detected based on the VSWR measurements.

10. The method of claim 9, wherein performing the VSWR measurements comprises performing at least two VSWR measurements that are separated by at least 10 ms.

11. The method of claim 9, wherein the sampling period comprises a rolling sampling period.

12. An electronic device comprising:
    an antenna;
    a transmitter coupled to the antenna over a radio-frequency transmission line path, the transmitter being configured to transmit radio-frequency signals using the antenna and the radio-frequency transmission line path;
    a voltage standing wave ratio (VSWR) sensor disposed on the radio-frequency transmission line path, the VSWR sensor being configured to gather VSWR values from the radio-frequency signals transmitted by the antenna; and
    one or more processors configured to
        detect a range to an external object based on the radio-frequency signals transmitted by the antenna and a reflected version of the radio-frequency signals transmitted by the antenna, and
        calibrate the detected range based on a removable case detected, by the one or more processors, based on the VSWR values.

13. The electronic device of claim 12, the one or more processors being further configured to perform removable case detection when a variation in the VSWR values is less than a threshold value.

14. The electronic device of claim 13, wherein the VSWR values are gathered over a sampling period, the one or more processors being further configured to identify the variation in the VSWR values by subtracting a minimum of the VSWR values gathered over the sampling period from a maximum of the VSWR values gathered over the sampling period.

\* \* \* \* \*

UNITED STATES PATENT AND TRADEMARK OFFICE
CERTIFICATE OF CORRECTION

PATENT NO. : 11,782,151 B2
APPLICATION NO. : 17/332221
DATED : October 10, 2023
INVENTOR(S) : Joonhoi Hur et al.

Page 1 of 1

It is certified that error appears in the above-identified patent and that said Letters Patent is hereby corrected as shown below:

In the Claims

Column 21, Line 42, "The electronic device of claim 1, wherein the one or" should read -- The electronic device of claim 1, the one or --

Signed and Sealed this
Ninth Day of January, 2024

Katherine Kelly Vidal
*Director of the United States Patent and Trademark Office*